April 14, 1931. H. PIERCE 1,800,228

DRYING MACHINE

Filed May 7, 1928 7 Sheets-Sheet 1

Fig.-1

INVENTOR
Harry Pierce
BY Brockett & Hyde
ATTORNEYS

April 14, 1931.  H. PIERCE  1,800,228
DRYING MACHINE
Filed May 7, 1928  7 Sheets-Sheet 4

INVENTOR
Harry Pierce
BY
Brockett & Hyde
ATTORNEYS

April 14, 1931. H. PIERCE 1,800,228
DRYING MACHINE
Filed May 7, 1928 7 Sheets-Sheet 6

INVENTOR
Harry Pierce
BY
Brockett & Hyde
ATTORNEYS

Patented Apr. 14, 1931

1,800,228

UNITED STATES PATENT OFFICE

HARRY PIERCE, OF BROOKLYN, NEW YORK

DRYING MACHINE

Application filed May 7, 1928. Serial No. 275,750.

Generally speaking, this invention relates to fabric treating machines or apparatus and to driving and controlling mechanism for machines such as drying, dry cleaning, dyeing and washing machines.

More specifically, the invention as regards the drying machine for example, comprises a plurality of drying units operated preferably from a single prime mover with individual time control mechanism whereby the materials to be treated may be arranged in lots or groups each consisting of a plurality of batches, one batch being capable of proper treatment in one of said units.

This arrangement permits the loading of an individual unit and the unloading thereof at the proper time, as respects the dryness of the material, without interfering with the operation of the other units.

The invention also has to do specifically with driving and controlling mechanism arranged in a manner such that the operator may load one unit, close the doors, set the timing mechanism, start the machine and leave it to perform its operation, at the expiration of which the driving mechanism will automatically stop the drive and open the machine ready for unloading without any danger of the batch being over-dried or improperly treated.

Other features of the invention will be apparent from the following description, drawings and claims.

Referring to the drawings.

Figure 1:
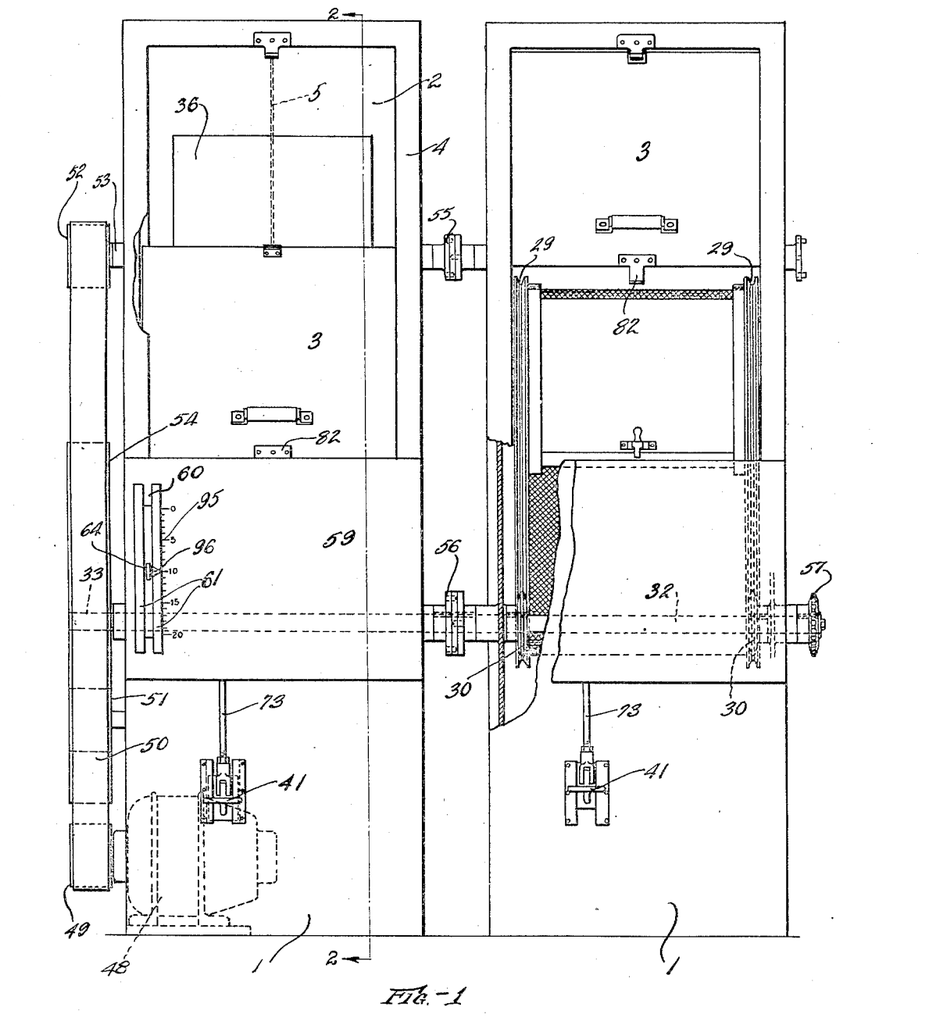
Fig. 1 is a front elevation of drying apparatus controlled according to my invention showing two units coupled together with parts broken away.
Figures 2, 3:
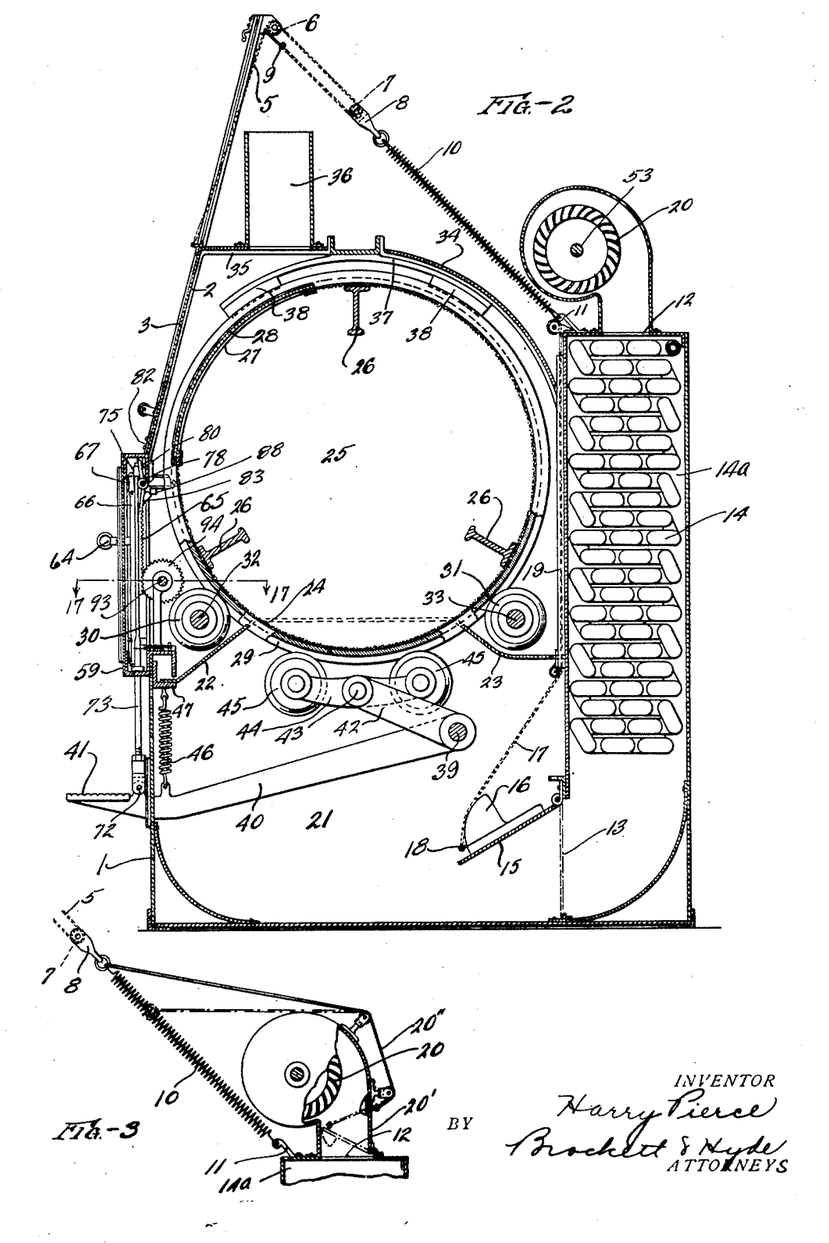
Fig. 2 is a section upon the line 2—2, Fig. 1.
Fig. 3 is a detail of the fan and the fan damper control.

In the embodiments of the invention shown in the drawings and with particular reference to Figs. 1, two treating units are shown coupled together and driven from the same prime mover or driving shaft. In this arrangement the units are practically identical except for the drive which will be explained later. Each unit consists of an outer casing 1 of rectangular shape in front elevation and provided with a suitable door opening 2 at the top and front, as shown in Fig. 2. This opening 2 is adapted to be closed by a suitable sliding door 3 guided in suitable guideways 4 extending above the machine. The door is provided with a suitable counterbalancing and opening means consisting of a cable 5 extending upward and over a pulley 6 at the top and thence down over a pulley 7 in a block 8 and dead-ended at 9. Engaging the block 8 is a spring 10 secured to a suitable clip 11 at the rear of the machine.

The main casing 1 in vertical cross section is substantially like the construction shown in Fig. 2. It is provided at the rear with a suitable heating chamber 14ª closed except for an opening 12 at the top and an opening 13 at the bottom, opening laterally into the main body of the casing. This heating chamber is provided with suitable heating coils 14. A door 15 is provided within the main casing and is adapted to be swung upon an upper pivot to open and close the opening 13. This door is provided with a segment 16 for receiving a cable 17 dead-ended on the door at 18 and extending up through the tube 19 and out at the top and connected to the pulley 8.

The upper part of the heating chamber is provided with a suitable fan 20 adapted to receive and discharge air through the opening 12 into the heating chamber where it will be blown down and out through the opening 13 into the main casing.

The outlet of the fan casing may be provided with an opening closed by a hinged shutter 20', Fig. 3, connected by a cable 20" passing over suitable pulleys and leading to the eye of the block 8, the arrangement being such that as the main door 3 is closed, the shutter 20' closes the discharge from the fan to the outside air causing it to direct its air stream into the heater 14ª, and conversely, when the door is open, this shutter closes the passage to the heating chamber 14ª and opens it to the outside air.

The main casing has a suitable air circulating chamber 21 provided with front and rear baffles 22 and 23 respectively. These baffles extend inwardly and upwardly with their inner edges near the cylinder for directing the heated air directly against the reticulated wall 24 of the cylinder 25.

This cylinder is provided interiorly with baffles 26 usual in this type of device and with a suitable opening 27 closed by a reticulated sliding door 28. Different from most machines of this type, this cylinder is not mounted upon trunnions in fixed bearings, but is provided on both of its ends with driving disks each having a peripheral V-shaped groove 29, as shown to the right in Fig. 1. There is one of these disks at each end of the cylinder and their grooves receive driving rollers 30 and 31 each having a V-shaped periphery for nesting in the corresponding groove 29. The driving rollers 30 and 31 are mounted upon fixed shafts 32 and 33 respectively and these shafts are constantly driven as will later appear.

The main casing 1 is further provided with a curved upper back portion or plate 34 extending forward and merging into a horizontal plate 35 provided with an outlet stack 36. Secured to these two plate portions 34 and 35 is an arc-shaped brake support or bracket 37 carrying, preferably, a pair of brake shoes 38 of the proper shape to nest into the V-shaped grooves 29 of the disks on the ends of the cylinder when the same is raised out of engagement with the driving rollers 30 and 31.

In order to elevate the drum to stop the drive from the rollers 30 and 31 and to apply the brake, the casing is provided with a transverse supporting shaft 39 carrying an operating lever or arm 40 provided with a foot plate 41. This shaft is also provided with a pair of lever arms 42 at each side of the machine and supporting another transverse shaft 43 carrying a pair of saddles 44. The shaft 43 is substantially at the center of these saddles and at the outer ends they are provided with suitable rollers 45 having V-shaped peripheries adapted to engage in the grooves 29 of the driving disks for the cylinder. When the shaft 39 is rocked clockwise, the rollers 45 engage the cylinder and elevate it, but when rocked in the opposite direction the roller move down out of engagement with the drum and settle it upon its driving rollers. The shaft 39 has a tendency to rotate clockwise through the instrumentality of a spring 46 secured to the lever 40 and to a frame part 47 so that it normally tends to raise the cylinder and bring its driving disks into engagement with the brake shoes 38, as shown in Fig. 2. This normal tendency may be overcome by a suitable timing mechanism to be described.

Figure 4:
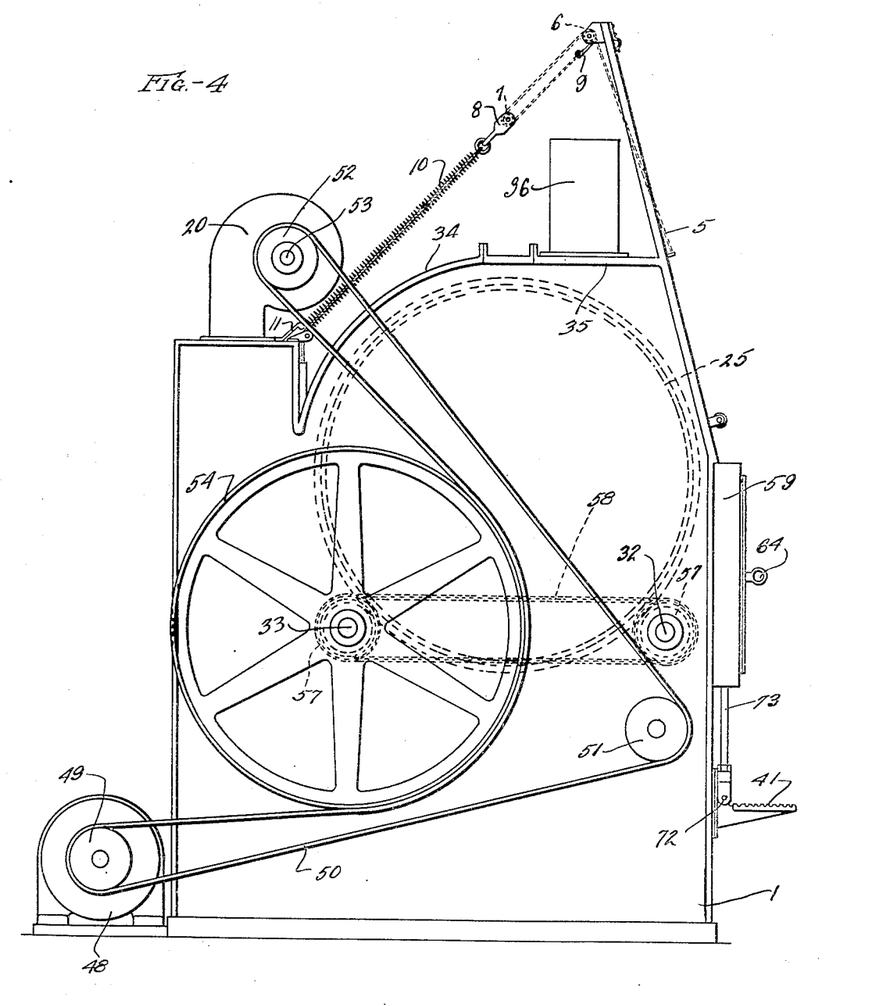
Fig. 4 is a left side elevation of the first unit.
Figure 5:
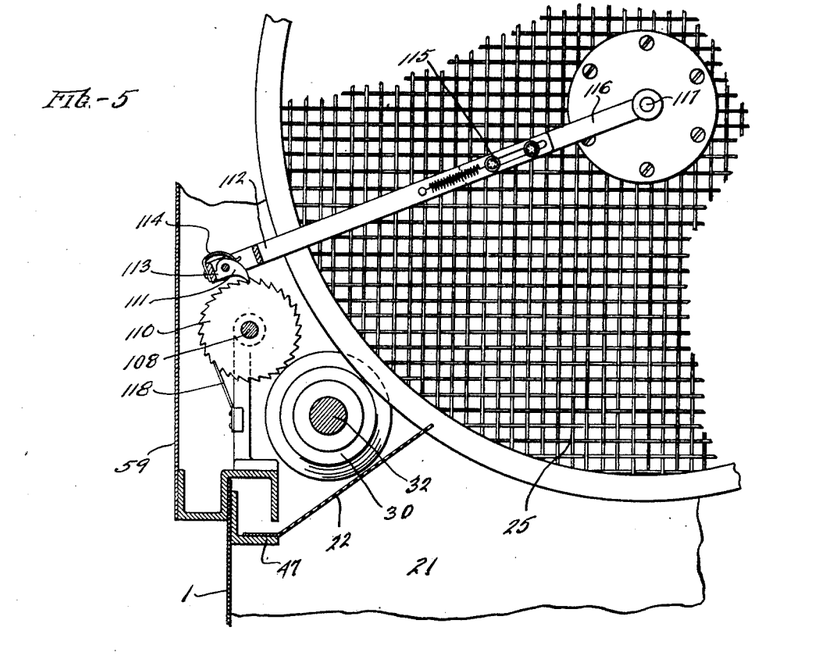
Fig. 5 is a detailed view of the driving mechanism for the timing device.
Figure 6:
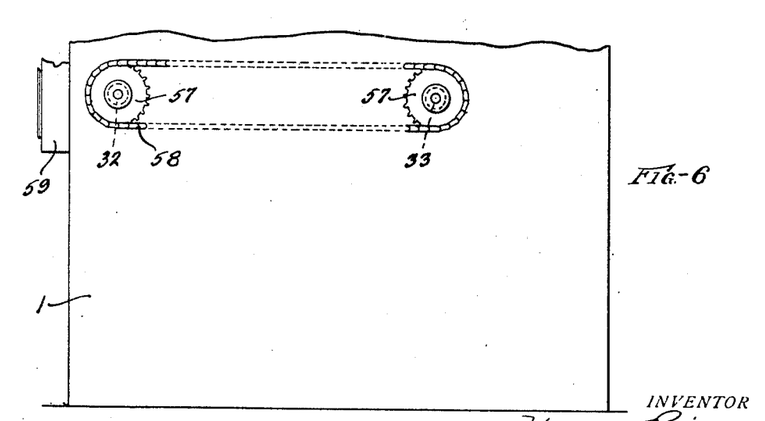
Fig. 6 is an end elevation of one of the units of the machine, as shown in Fig. 1, showing the chain drive for the driving rollers.

The drive for the apparatus comprises a motor indicated at 48 in Fig. 1, provided with a pulley 49 driving a belt 50 passing around an idler 51, a pulley 52 mounted on the fan shaft 53, and around a larger cylinder driving pulley 54 arranged upon the shaft 33. All of these pulleys are at the end of one of the units and preferably the extreme end one at the left as shown in Fig. 1. The fan shaft 53, is continued at both sides of each unit and is provided on the left, in the case of the first unit, with a pulley 52, and on the right with a coupling 55. In like manner each of the shafts 32 and 33 are extended out beyond the sides of the unit and are there provided on either or both sides, the right hand side as shown in Fig. 1, with coupling members 56. These coupling members 55 and 56 are adapted to engage with similar coupling members carried by similar shafts on the next unit, as shown in Fig. 1. However, in case of the last unit to the right, as shown in Fig. 1, the shafts 32 and 33 are provided with sprocket wheels 57 for receiving a sprocket chain 58 indicated in Fig. 4, and furnishing a drive between these two shafts 32 and 33, so that in the case of a plurality of units all of the fan shafts are driven by couplings from the one fan shaft pulley 52 while the forward shafts 32 are coupled and driven by sprockets and a chain at the end of the last unit or the one opposite to the drive belt and drive pulleys.

The description thus far has been confined to the general features of the apparatus with the details of the several units and the power or driving mechanism and the description will now take up the matter of the door lock and timing control.

Figure 11:
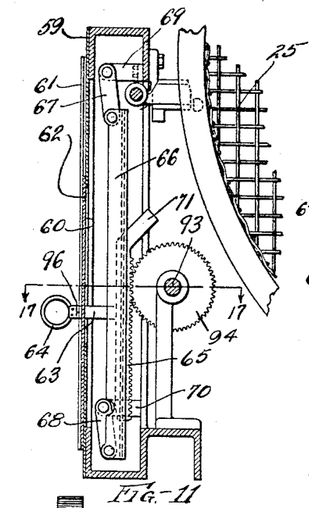
Fig. 11 is a detail view showing the timing rack in mesh with the gear and set for a predetermined treating interval.
Figure 12:
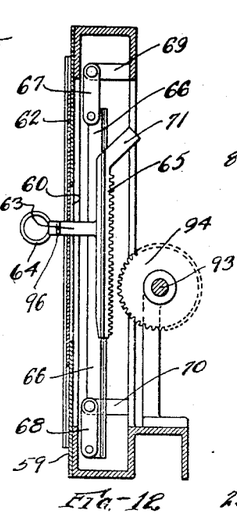
Fig. 12 is a similar view with the parts in the position they assume when the operator has withdrawn the rack preparatory to setting the timing mechanism.

This mechanism comprises a casing 59 arranged at the front of the machine and consisting of a shallow pan-like box closed to the operator at the front and open to the machine casing at the rear. At the left hand end, as shown in Figs. 1, 11 and 12, this box is provided with a slot 60 for a timing device manipulating member as will appear. On each side of this slot the front face of this housing is provided with parallel guide ways 61, one on each side of the slot and adapted to receive a closing slide 62. This slide closes the slot 60. It is provided with an opening for receiving a manipulating member 63, shown in Figs. 11 and 12 and elsewhere. The front end of it is provided with a suitable hand piece 64. The inner end of this manipulating member is secured to a rack bar 65 slidably engaging, by tongues 65′, a pair of rack bar supports 66 pivoted to swinging links 67 and 68 at the top and bottom respectively. These links are secured at their upper ends to suitable brackets 69 and 70, respectively, secured to the timing casing. By pulling outward on the handle the rack bar 65 is moved forward for releasing it from the timing gear to be described. The upper end of the rack bar 65 is provided with a lug 71 extending upwardly and rearwardly as shown in Figs. 11 to 16. It is obvious from the foregoing that the rack bar when pulled forward, may be slid up and down in the supports 66 to bring the lug 71 to any desired position.

Figure 7:
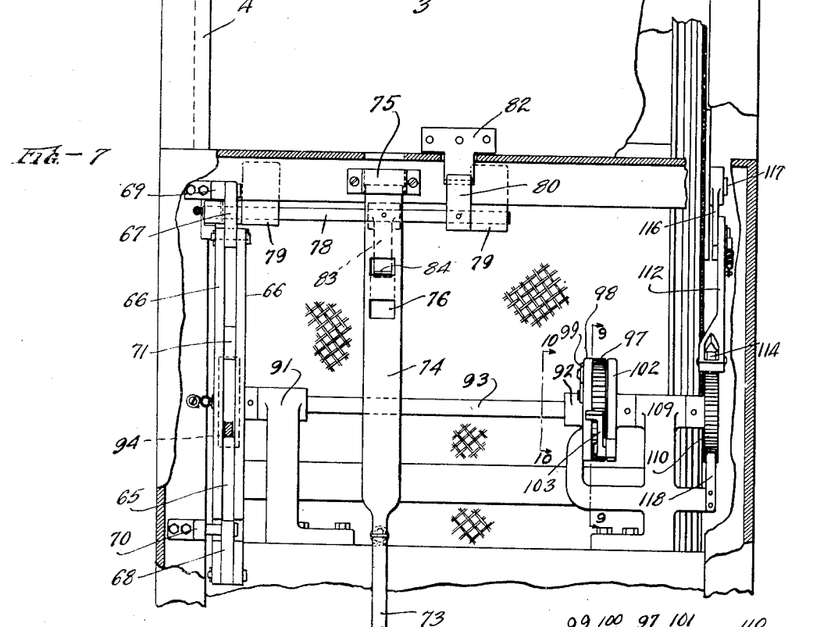
Fig. 7 is a front elevation of the outer casing door, its latches and the timing mechanism.

Secured to the lever 40 at 72, Fig. 7, is a rod 73 extending up into the casing 59 and to the right of the rack structure just described, as shown in Fig. 7, where it is continued in a flat member 74 and guided in an upper strap 75. This flat rod portion 74, near its upper end as shown clearly in Figs. 7 and 14 to 16, is provided with an opening 76 interrupted by a cross member having a vertically inclined rear face 77, as viewed in Figs. 2 and 14 to 16.

Figure 13:
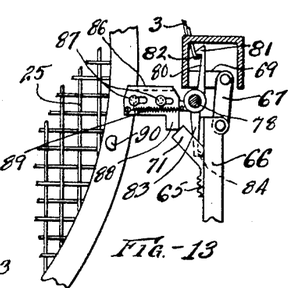
Fig. 13 is a detail view of the latch tripping mechanism with the trip in normal running position and the latching mechanism in latched position.
Figure 14:
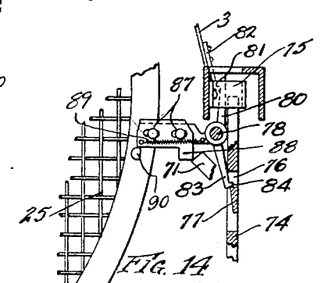
Fig. 14 is a similar view of the latch mechanism showing the trip in engaging position.
Figure 15:
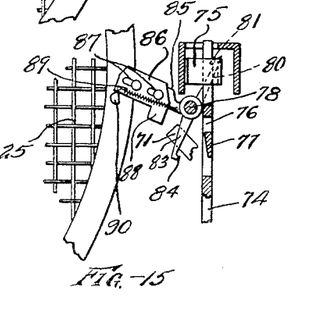
Fig. 15 is a view of this latch tripping mechanism showing the latch disengaged.
Figure 16:
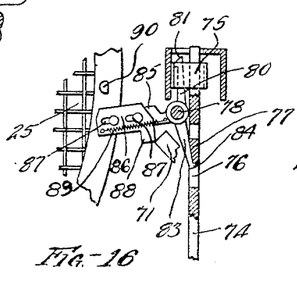
Fig. 16 is a further view of the latching mechanism showing the position of the parts after the cylinder has been stopped and the outer casing door opened.
Figure 17:
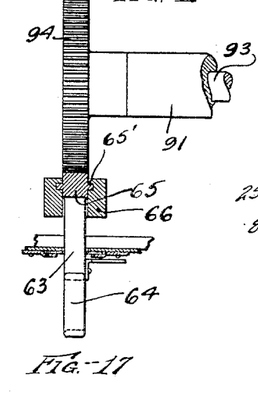
Fig. 17 is a detail view taken upon the line 17—17, Figs. 2 and 11.

This bar 74 slides up and down in front of a transverse shaft 78 mounted in suitable bearings 79 secured to the casing 59 and carries a door latch lever 80 extending upward back of the bar 74, as clearly shown in Figs. 14 to 16, and carrying a latching nose 81 for engaging a suitable keeper 82 secured to the door 3. The shaft 78 is also provided with a similar downwardly extending lock lever 83 having a nose 84 adapted to engage either the upper or the lower edge of the cross bar having the inclined face 77, as shown in Figs. 14 to 16, the inclined face 77 permitting the power off locking effect shown in Fig. 16. This shaft 78 is further provided with a rearwardly extending trip support 85 receiving a sliding trip block 86 mounted, by a pin and slot arrangement indicated at 87, on the support 85. This trip block is provided with a downwardly extending trip lug 88 adapted at the proper time to engage the rack lug 71, as will appear. A spring 89 normally tends to retract this trip block 86 toward the shaft 78, as shown in Fig. 13, but when the rack lug 71 is elevated the trip lug is forced outward where it may engage a pin 90 secured upon the side of the periphery of the cylinder. The operation of this trip will be given more fully in connection with the timing gear arrangement now to be described.

Secured in suitable bearings 91 and 92 arranged within the casing 59 is a transverse timing shaft 93 carrying at the left hand end, as shown in dotted lines, Fig. 7, a rack gear 94 adapted to mesh with the rack 65 when it is in the rear position or that shown in Fig. 11. This shaft and gear is so located that the rack and its supports may be swung forward to move the rack out of mesh with the gear when the rack may be lowered or raised as desired. This is the arrangement for setting the time of operation and to indicate this time the front of the casing 59 is provided with suitable graduations indicated at 95 and adapted to cooperate with an index member 96 carried by the manipulating member 63.

Figures 8, 9:
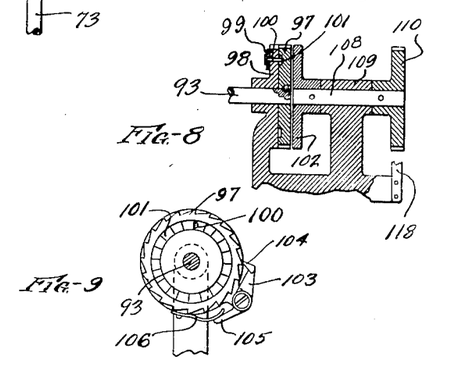
Fig. 8 is a detail view and vertical section of a part of the timing mechanism.
Fig. 9 is an end elevation of this mechanism taken on the line 9—9, Fig. 7, looking to the right.
Figure 10:
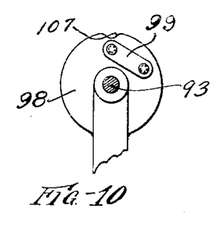
Fig. 10 is a section upon the line 10—10, Fig. 7, looking to the right.

Referring now to Figs. 5, 7 to 10, the opposite end of the shaft is provided with a ratchet wheel 97 arranged alongside a disk 98 forming a part of the bearing 92. This disk is provided with a pawl spring 99 carrying a pin 100 extending through the disk and engaging ratchet teeth 101 provided on the side face of the ratchet wall 97, as shown in Fig. 9. In juxtaposition to the disk 97 is a pawl carrier disk 102 carrying a pawl 103 provided with a tooth 104 for engagement with the peripheral ratchet teeth of the ratchet wheel 97. This pawl is also provided with a tail 105 engaged by a spring 106 for thrusting the tooth 104 toward the ratchet wheel 97. The periphery of the fixed disk 98, as shown in Fig. 10, is provided with a depression 107 extending inward to expose the teeth of the ratchet wheel 98 for a one tooth distance, while the disk itself is of the same overall diameter as the ratchet wheel 97. In this way the pawl has an opportunity to step the ratchet wheel 97 and the shaft 93 one notch for each revolution of the pawl carrying disk 102, the pawl riding upon the periphery of the fixed disk 98 for the remaining part of the revolution. The pawl disk 102 is secured to a shaft 108 mounted in a bearing 109 in alignment with the bearings 91 and 92. The outer end of this shaft 108 is provided with a driving ratchet wheel 110 adapted to be engaged by a pawl 111, Fig. 5, pivotally mounted in the outer end of an oscillating bar 112. This pawl is provided with a stop 113 for limiting the clockwise movement of the pawl and a spring 114 for holding it in engagement with the stop, as shown. This bar is connected by a slot and pin structure indicated at 115 to an extension bar 116 pivoted eccentrically at 117 to the end of the cylinder. As the cylinder rotates the pawl bar as a whole, comprising the parts 112 and 116, is oscillated back and forth to transmit a step by step motion through the pawl and ratchet wheel 110. A spring keeper 118 secured to a stationary part holds the ratchet wheel 110 against accidental reverse movement.

The articles to be treated, such as laundry work, are separated into batches, say for example, the laundry of single customers, and after being treated in the various other processes, not concerned here, they arrive at this drying or treating apparatus where the batch arrangement is continued by putting each batch in its own separate unit. For example, one batch is arranged in the first machine, the one to the left as shown in Fig. 1, and when the door of the cylinder is closed the operator then sets the timer by pulling the rack forward and moving it down to the point indicated upon the graduations at the front of the machine, say ten minutes. The operator then releases the timing bar when it will move back into engagement with the gear 94. The casing or cover door 3 is then closed bringing its keeper 82 down into engagement with the nose 81 of the latch lever 80. In performing this operation, however, the bar 74 is released by reason of the lock lever 83 being moved clockwise so that the treadle 41 may now be depressed to lower the cylinder into driving relation with its driving rollers 30 and 31. When this operation is performed the nose 84 of the locking lever 83 passes in above the cross bar 77, of the bar 74, and locks the treadle and the bar 74 in running position. In this position the trip block 86 has been moved to the right, as shown in Fig. 13, because the lug 71 has been moved down with the setting of the timing device. The machine will then continue to operate until the timing mechanism already described raises the rack bar 65 and brings the lugs 71 into substantially the positions shown in Fig. 14 when its inclined end will move the trip block 86 out into the path of the pin 90 which rocks the door latch lever and the locking lever 83 in a clockwise direction, as shown in Figs. 13 to 16, thereby releasing the bar 74 to the action of the spring 46 which raises the cylinder and moves it into engagement with the brake shoes 38 when the cylinder will be stopped and the door will be open ready for unloading. The stopping of the machine by the timing device therefore halts the cylinder with its door spotted in position before the outer casing door without any further attention from the operator. Furthermore, the latch lever 83 is so designed that when the bar 74 is elevated so that the parts assume the position shown in Fig. 16, the lever 83 holds the bar 74 against downward movement requiring the cover to be closed first. Through the camming action of the keeper with the nose 81 of the latching lever 80, the locking lever 83 moves into a position such that the bar 74 may be moved down freely when the locking lever 83 will move above the cross member 77 and hold the door shut with the power on.

Figure 18:
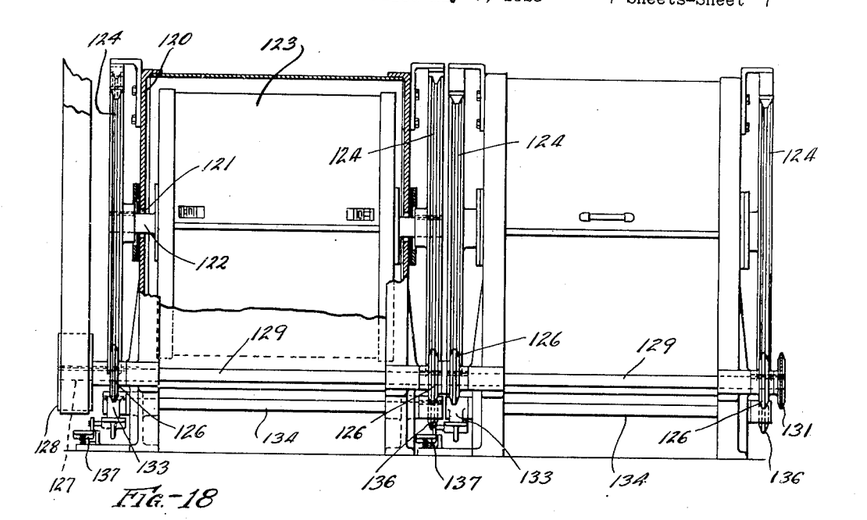
Fig. 18 is a front elevation partly in section showing a modified form of fabric treating machine such as would be useful in the adaptation of the invention to washing machines.
Figure 19:
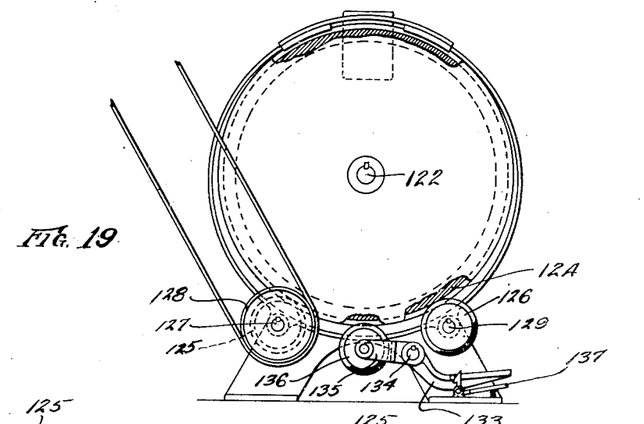
Fig. 19 is an end elevation partly in section showing the driving mechanism for the type of machine shown in Fig. 18.
Figure 20:
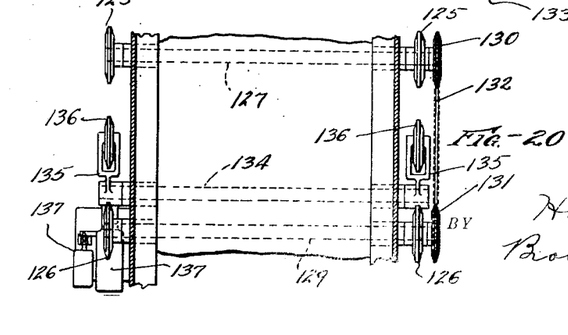
Fig. 20 is a top plan view partly in section showing the driving mechanism.

In the adaptation of the invention to different types of machines, as for example one type of washing machine where the cylinders are within the casing and the driving disks are upon the outside, the detail mechanism is slightly different. This is clearly shown in Figs. 18, 19 and 20 wherein the outer casing 120 is provided with suitable slotted openings as at 121 in its ends for the reception of trunnions 122 carried by the cylinder 123. Each of these trunnions is provided with a driving disk 124 each having a V-shaped peripheral groove for engagement with driving rollers 125, 126, the former being mounted upon a shaft 127 driven by a suitable pulley 128 and the latter being mounted upon a shaft 129 driven by sprockets 130 and 131 and a chain 132. Secured to the base of the machine is a suitable lever 133 mounted upon a shaft 134 extending across the machine and supporting a pair of arms 135 each carrying an idler roller 136 adapted to engage in the grooves of the driving disks to raise the cylinder out of engagement with the driving roller. This lever 133 may be locked up with the cylinder out of driving position by means of a treadle operated latch 137.

What I claim is:

1. A fabric treating unit comprising an outer casing having a heating chamber, a treating chamber, pairs of spaced driving rollers, a drum within the casing, driving disks carried thereby and engaging the pairs of driving rollers, and means for raising said cylinder from said driving rollers.

2. As in claim 1 wherein braking means is provided for engagement with the driving disks to brake the rotation of the cylinder when the cylinder is elevated.

3. As in claim 1 wherein the driving disks are provided with peripheral grooves for receiving the driving rollers and the elevating means comprises rolls for engaging in the grooves to elevate the cylinder.

4. As in claim 1 wherein the driving disks are provided with peripheral grooves for receiving the driving rollers and the elevating means comprises rolls for engaging the grooves to elevate the cylinder and the casing is provided with brake shoes engaging in the peripheral openings of the driving disks for braking the rotation of the cylinder when raised out of driving position.

5. As in claim 1 wherein the machine is provided with means including a timing device for operating said cylinder raising means.

6. As in claim 1 wherein the machine is provided with means normally tending to raise said cylinder and to stop the drive, means for preventing the operation of said cylinder raising means, and timing means for releasing said cylinder raising means.

7. As in claim 1 wherein the cylinder raising means includes a spring and timing means for latching said cylinder raising means against the action of said spring and timing means for releasing said holding means.

8. As in claim 1 wherein said cylinder raising means comprises a main operating lever and saddles carrying idlers engaging the driving disks of said cylinder.

9. Fabric treating apparatus comprising a plurality of batch units each consisting of an individual casing and a revolving hollow batch cylinder within the casing, said cylinder being provided with a door, a constantly operating power element common to all of said units, a connectible and disconnectible transmission between each cylinder and said power element, operator operated means for connecting said cylinder through said transmission to the power element, a timing device individual to each unit, and means controlled by said timer for disconnecting said transmission.

10. Fabric treating apparatus comprising a plurality of batch units each consisting of an individual casing and a revolving hollow batch cylinder within the casing, said cylinder being provided with a door, a constantly operating power element common to all of said units, a connectible and disconnectible transmission between each cylinder and said power element, operator operated means for connecting said cylinder through said transmission to the power element, a timing device individual to each unit, means for disconnecting said transmission and including a device having two positions in one of which it can engage a moving part and disconnect the transmission, and means carried by the timer for actuating said device to move it into operative transmission releasing position.

11. Fabric treating apparatus as in claim 10 wherein the means for moving said device into operative position is carried by the cylinder.

12. Fabric treating apparatus as in claim 10 wherein the means for moving said device into operative position is carried by the cylinder and has a definite relation with respect to the door of the cylinder for spotting the same.

13. Fabric treating apparatus as in claim 9 wherein the power element comprises a shaft extending through each unit and each shaft end is provided with a coupling for coupling to an adjacent unit or to a prime mover.

In testimony whereof I hereby affix my signature.

HARRY PIERCE.